2,952,511

SEPARATION OF PLUTONIUM VALUES FROM URANIUM AND FISSION PRODUCT VALUES

Alfred Gavin Maddock, Montreal, Quebec, and Adrian Hadfield Booth, Chalk River, Ontario, Canada, assignors, by mesne assignments, to the United States of America as represented by the United States Atomic Energy Commission No Drawing. Filed Sept. 23, 1946, Ser. No. 698,870

1 Claim. (Cl. 23—14.5)

This invention relates to the separation of plutonium from admixture with other elements and more particularly to its separation from those elements associated with it in the process of its generation by neutron irradiation of uranium.

The absorption by uranium of neutrons results in the formation of plutonium and a number of radioactive isotopes of other elements. These isotopes, known as "fission products," give off beta and gamma rays which are exceedingly harmful to humans, so that workers dealing with them must be adequately protected. Accordingly simplicity and ease of operation of methods used are of major importance in carrying out the essential remote control of any separation scheme. The exceedingly small quantities of plutonium present in relation to the residual uranium is a further complicating factor.

It is known that plutonium has an upper valency state, believed to be six, in which it forms a water soluble fluoride, and lower valency states, believed to be three and four, in which it forms water insoluble fluorides. Advantage has been taken of these circumstances to provide a method of separating the plutonium involving solution and precipitation. However, in carrying out such process filtration or separation of the precipitated fluoride by a centrifuge offers great difficulty in remote control. Moreover, dissolution of a fluoride in concentrated sulphuric acid is objectionable in large scale operations and both sulphuric and hydrofluoric acids are corrosive.

The object of the present invention is to provide a method, which is readily capable of remote control, for the separation of small amounts of plutonium from large amounts of uranium and from small amounts of other elements, especially radiocative elements or fission products which emit many curies of dangerous beta and gamma rays.

A method embodying the invention makes use of the phenomenon of chemisorption, whereby plutonium in the tetravalent or trivalent form is chemically adsorbed on a fluoride in solid form. This avoids the use of corrosive hydrofluoric acid or soluble fluorides for precipitation of the plutonium as well as the difficulty of centrifugation or filtering under remote control conditions. The invention also contemplates the quantitive separation of plutonium fluoride from the adsorbent fluoride by use of oxalate or carbonate solutions which are not corrosive.

Other objects and advantages of the invention will appear from the following description which illustrates in detail one embodiment of it.

Neutron irradiated metallic uranium containing plutonium and fission products is dissolved in an acid preferably nitric, although solution in sulphuric and perchloric acids is suitable. The minimum amount of acid to dissolve completely the metal is preferred, although an excess of 10% is not harmful. Solutions having a concentration of 30 to 50% uranyl nitrate have been used, but concentrations of 5 to 60% or more by weight are satisfactory.

The plutonium in the solution is oxidized to the hexavalent or higher stage of oxidation by the use of any suitable oxidizing agent. Potassium dichromate has been used and also sodium persulphate in the presence of silver ions. The solution is heated to about 80 to 90° C. to complete the oxidation and then cooled.

This solution is passed through the fluoride, placed, for example, in a column to remove the chemisorbable fission products. The solution may be applied to the chemisorption agent in any convenient way. Precipitated calcium fluoride which has been sintered at about 800° C. has been used in most cases and is preferred. Sintered lanthanum fluoride, strontium fluoride, rare earth fluorides or granulated natural fluorspar may be used.

Solutions of uranyl nitrate have a solvent action on calcium fluoride and lanthanum fluoride. There is, therefore, added to the solution of uranium before treatment for chemisorption of the fission products and of the plutonium either sufficient of the adsorbing fluoride itself to saturate substantially the solution or appropriately larger amounts of salts which provide a common ion effect, such as calcium salts or salts of hydrofluoric acid. The preferred method is to add the chemisorption agent itself, such as calcium fluoride or lanthanum fluoride, until saturation of the uranium solution is achieved, although suitable amounts of soluble calcium or fluoride salts, such as calcium nitrate or sodium fluoride may be added. Dissolution by the uranium solution of the relatively insoluble fluoride used as chemisorption agent is thus avoided. The thus treated solution may be applied to successive batches or lots of the chemisorption agent, arranged in a column or otherwise, to adsorb those of the fission product elements which are capable of adsorption on the fluoride. The operation may be repeated if required to achieve the desired degree and efficiency of removal of the adsorbable fission products from the solution containing plutonium in the hexavalent form. After this step the chemisorption agent may be washed with dilute acid, preferably 1–2 normal nitric acid, and the washings combined with the main solution for maximum recovery of the plutonium.

The plutonium in the solution is now reduced to the tetravalent state with any suitable reducing agent. Sulphurous acid either in solution or as a gas has been found preferable but generally any reducing agent may be used which will reduce the plutonium without reducing the uranium and which is not objectionable for obvious reasons such as forming a precipitate. Solutions of ferrous sulphate or sodium thiosulphate may be used.

This reduced solution is now applied to a chemisorption agent as previously described to adsorb on the fluoride the tetravalent and/or trivalent plutonium. The uranium and the non-adsorbable fission products remain in the solution. The chemisorption agent may be washed with dilute acid as before.

The plutonium is then removed from the chemisorption agent by a solution of ammonium oxalate, preferably saturated, or by a solution of ammonium carbonate, preferably of 10–20% concentration. Ammonium oxalate is more efficient than ammonium carbonate. Any other soluble oxalate or carbonate or bicarbonate may be used. Such solution dissolves the plutonium, probably as a complex fluoroxalate or fluorcarbonate ion. The solution contains substantially all the plutonium.

To illustrate the efficiency of the method the following specific example is given.

A 50% uranyl nitrate solution containing plutonium amounting to 107,640 alpha counts per minute and fission products amounting to 8000 gamma counts per minute was used. It was oxidized with potassium dichromate. It was passed successively through two columns, containing the chemisorption fluoride, in each of the two chemisorption stages above described. Sulphurous acid was used as the reducing agent. The ammonium oxalate solution contained 98.6% of the plutonium and about 0.35% of the gamma active fission products in the original material.

The term "chemisorption" as used herein means adsorption of a material in a solution on the surfaces of a solid or substrate by processes involving both chemical and physical reactions. A 50% uranyl nitrate solution means that the solution contains 50% by weight of uranyl nitrate in 100 cc. of solution.

It should be stated that the oxalate or carbonate solution may be used to remove the adsorbed fission products from the fluoride reagent in the initial chemisorption treatment.

We claim:

A method of recovering plutonium from materials containing plutonium, uranium and fission products which comprises dissolving the material in nitric acid, oxidizing the plutonium in the resulting solution to the hexavalent state, adding to the solution a soluble calcium salt which by the common ion effect inhibits dissolution of a fluoride by the solution, passing the solution through a subdivided calcium fluoride which has been sintered at about 800° C., reducing the plutonium in the solution to a valent state not higher than the tetravalent state, passing the solution through a subdivided calcium fluoride which has been sintered at 800° C., as an adsorption reagent and removing the plutonium from the adsorption reagent.

References Cited in the file of this patent

UNITED STATES PATENTS

| | | |
|---|---|---|
| 2,776,185 | Werner | Jan. 1, 1957 |
| 2,785,951 | Thompson et al. | Mar. 19, 1957 |
| 2,799,553 | Thompson et al. | July 16, 1957 |
| 2,863,719 | Komack et al. | Dec. 9, 1958 |
| 2,868,619 | Ritter | Jan. 13, 1959 |
| 2,877,909 | Finzel | Mar. 10, 1959 |
| 2,912,303 | Fries | Nov. 10, 1959 |

OTHER REFERENCES

McMillan and Abelson, Physical Review, vol. 57, pages 1185–6 (1940).